United States Patent
Kuehl

[15] 3,679,074
[45] July 25, 1972

[54] TRANSPORT DEVICE

[72] Inventor: Guenther L. Kuehl, Peekskill, N.Y.
[73] Assignee: Guenther Systems, Inc., Buchanan, N.Y.
[22] Filed: April 22, 1970
[21] Appl. No.: 38,639

Related U.S. Application Data

[62] Division of Ser. No. 798,366, Feb. 11, 1969, Pat. No. 3,578,145.

[52] U.S. Cl. ............................................214/83.26, 296/57
[51] Int. Cl. ..........................................................B60p 1/38
[58] Field of Search .....................214/83.26, 83.36; 198/115, 198/154; 296/57

[56] References Cited

UNITED STATES PATENTS

| | | |
|---|---|---|
| 1,704,841 | 3/1929 | Sacerdote............................214/83.26 |
| 3,024,891 | 3/1962 | Sawrie....................................198/154 |
| 3,184,039 | 5/1965 | Czarnecki..............................198/154 |

*Primary Examiner*—Robert G. Sheridan
*Attorney*—Brunbaugh, Graves, Donohue & Raymond

[57] ABSTRACT

An adjustable transport device is provided which includes a multiple chain drive system for transporting unit loads of material between a number of vertically and laterally displaced locations. In one embodiment, the device is provided as a truck attachment, and is a second embodiment, the vertical lift is permanently installed in a truck dock.

7 Claims, 4 Drawing Figures

PATENTED JUL 25 1972    3,679,074

INVENTOR.
GUENTHER L. KUEHL
BY
Brumbaugh, Graves, Donohue & Raymond
his ATTORNEYS

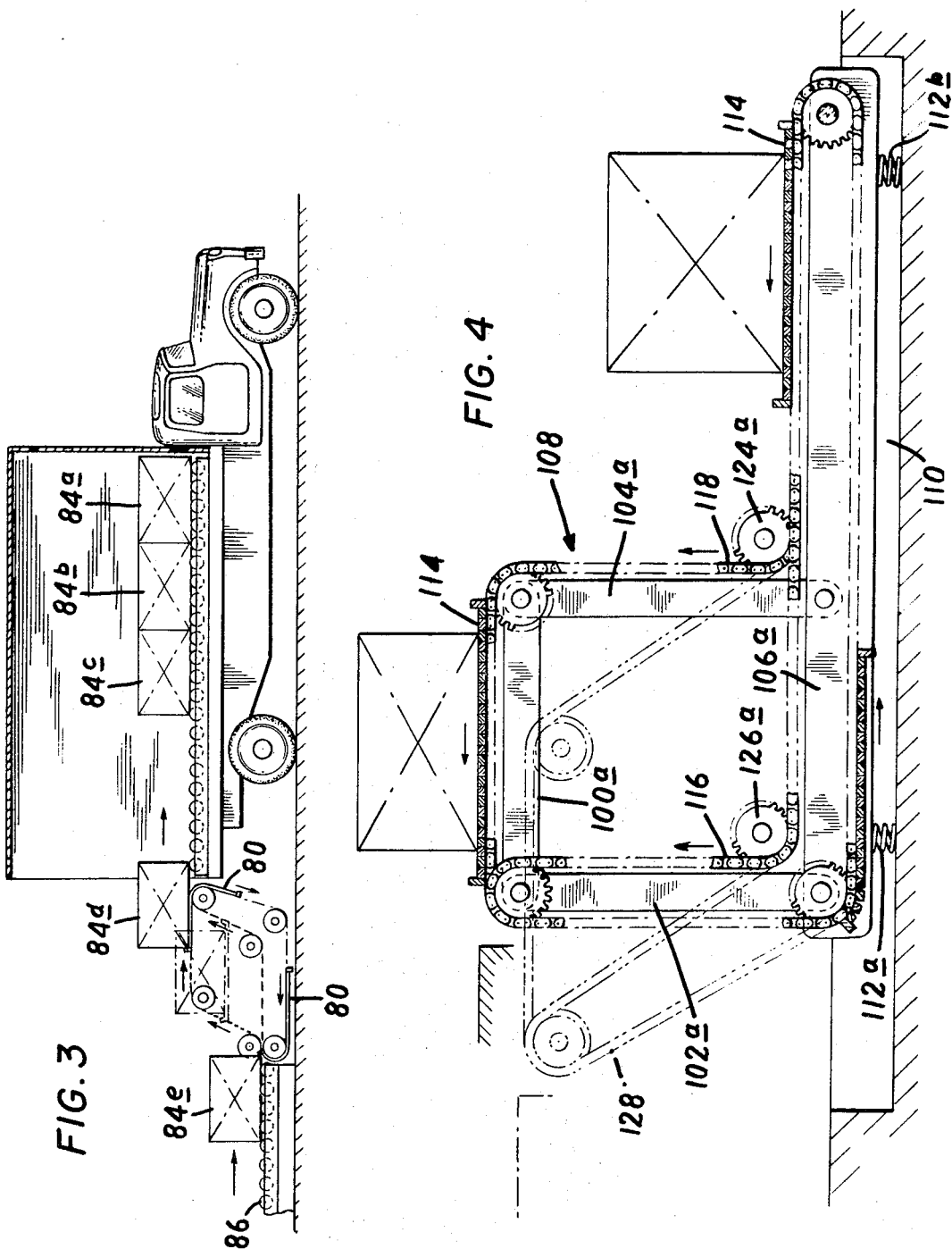

TRANSPORT DEVICE

CROSS-REFERENCE TO RELATED APPLICATION

This application is a division of application Ser. No. 798,366, filed Feb. 11, 1969, now U.S. Pat. No. 3,578,145.

BACKGROUND OF THE INVENTION

This invention relates to conveyor apparatus and, more particularly, to apparatus for automatically transporting unit loads of material between vertically and laterally separated loading and unloading stations.

In many cargo loading systems for trucks and the like, the cargo is carried to a platform or truck dock by a conveyor belt and then picked up and loaded onto the truck by a fork lift truck. Where pallets are employed to carry the cargo, the cargo carrying pallet is transferred from the loading platform to the truck and then separated from the cargo in the truck itself. In another type loading system, vertical lifts are provided to convey the cargo between a truck and the loading platform. A common vertical lift is the double chain type which carries a platform to support the cargo, the platform remaining in a horizontal position during vertical movement by the supportinG chains.

While the vertical lift type loadinG system provides obvious advantages over those systems utilizing fork lift trucks, a disadvantage with such systems is that each system must be uniquely designed to accommodate the expected vertical displacement between the cargo carrying trucks and the platform at each particular installation. For example, one installation may require a plurality of differently dimensioned vertical lift systems to accommodate the expected differences in truck sizes. In addition, because of the rigidity of the platforms carried by the vertical lifts of the prior art, limitations are placed in the directions travelled by the platform. This obviously restricts the uses to which the vertical lifts may be put. Also, none of the existing vertical lift type loading systems or elevators supply a cantilever motion to adjust to different locations of the loading or unloading station.

SUMMARY OF THE INVENTION

Accordingly, it is an object of the present invention to provide a transport device which overcomes the above-mentioned disadvantages of the prior art.

It is also an object of the present invention to provide a transport system which is adjustable in its vertical and horizontal dimensions and which is of unique and simple construction and susceptible of automatic operation.

It is still another object of the present invention to provide a transport device which includes a unique platform construction and chain drive system which makes it possible for one power source to move the platform continuously in any desired direction.

These and other objects are accomplished by the transport device of the present invention which comprises a plurality of pivotally connected support bars which define a support frame. At least two pairs of offset and movable endless flexible support members are supported by the frame and the support members are guided coextensively in a first direction by a first plurality of guide members. A second plurality of guide members guide one pair of the support members in a second direction back to the first plurality of guide members and third and fourth pluralities of spaced guide members guide the first and second pairs of support members, respectively, in a third direction to the first plurality of guide members and to the second plurality of guide members. Also provided is a reversible drive mechanism operatively coupled to the support members for moving the support members in either a first direction or a second direction.

In one preferred embodiment of the invention, the vertical lift device is permanently attached to a truck, replacing the loading gate of the truck, and, in a second preferred embodiment, the device is permanently installed in a truck dock.

BRIEF DESCRIPTION OF THE DRAWINGS

In the Drawings:

FIG. 3 illustrates a sequence of loading operations carried out by the transport device truck attachment shown in FIG. 1;

FIG. 4 is a side elevational view of a typical permanently installed, transport device arranged according to the present invention.

DESCRIPTION OF THE PREFERRED EMBODIMENTS

Figure 1:
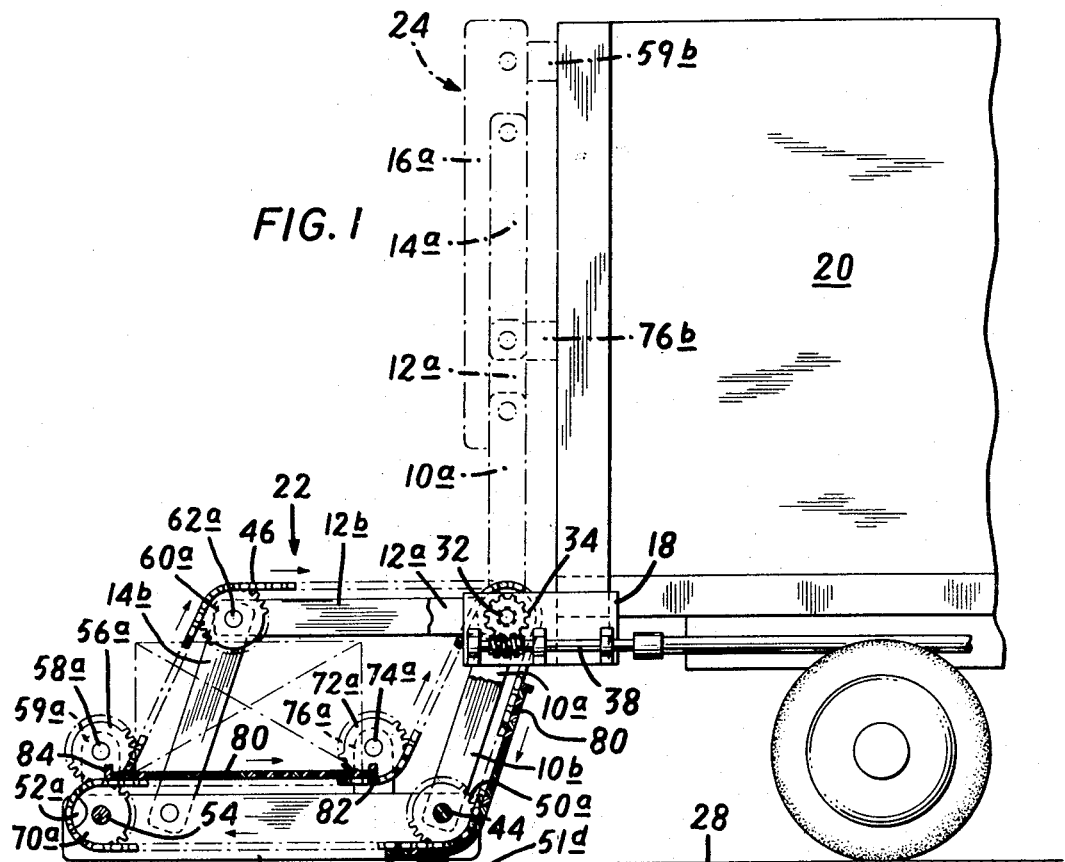
FIG. 1 is a side elevational view of a typical transport device attachment for trucks arranged according to the present invention.
Figure 2:
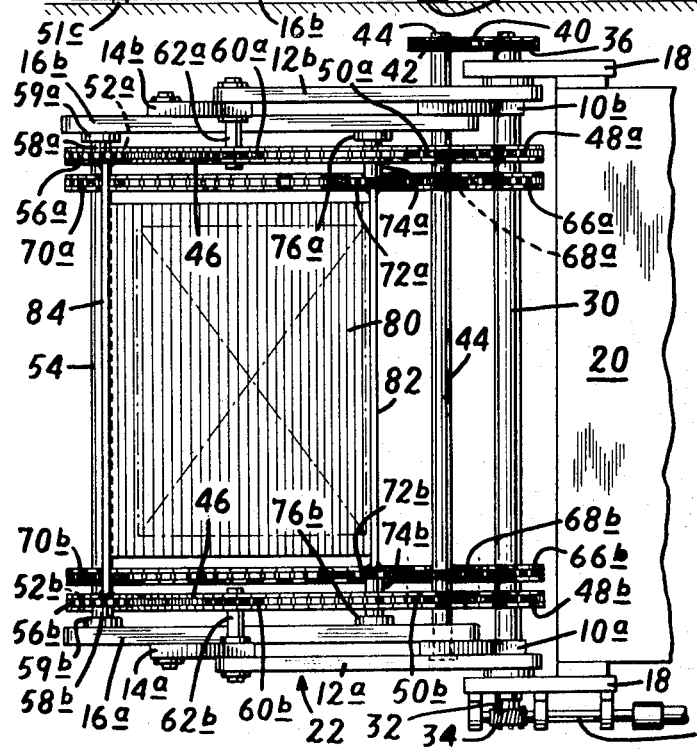
FIG. 2 is a fragmentary top plan view of the transport device truck attachment illustrated in FIG. 1.

In an illustrative transport device attachment for trucks arranged according to the present invention, as shown in FIGS. 1–3, a plurality of support arms 10a, 12a, 14a and 16a, pivotally connected at their ends, are secured to one edge of the frame 18 of a truck 20 and define one-half a support frame 22. As shown in FIG. 2, the other half of the support frame 2 is defined by a corresponding plurality of pivotally connected support arms 10b, 12b, 14b and 16b secured to the other side of the truck frame 18.

As shown by the broken lines 24 in FIG. 1, the support arms 10a, 10b, 12a, 12b, 14a, 14b and 16a, 16b are retained in generally upright positions against the frame 18 of the truck 20 in any conventional manner, replacing the typical loading platform or gate of the truck, until a loading or unloading operation is set to begin. Then, a connection between the support arms and the truck frame 18 is opened to drop the frame 22 from the truck onto a truck dock 28. Because of the pivotal connection between the support arms of the frame 22, the configuration of the assembled frame 22 will depend upon the displacement between the truck frame 18 and the dock 28. Specifically, where the displacement is less than the longitudinal dimension of the support arms 10a and 10b, the frame 22 taken on the angular appearance which is shown in FIGS. 1 and 3. Where the displacement equals the longitudinal dimension of the support arms 10a and 10b, the arms will intersect the laterally extending arms 12a, 12b; 16a and 16b at an angle of ninety degrees and the frame 22 will have a generally square-shaped configuration.

Referring to FIG. 2, the ends of the support arms 10a, 10b; 12a, 12b pivot about a rod 30 enclosing a drive shaft 32 which is terminated at its opposite ends by a worm gear 34 and a sprocket 36. Coupled to the worm gear 34 is a drive shaft 38 which is driven in either direction at a constant angular velocity by a driving member (not shown) such as a reversible motor or a power takeoff mounted in the truck 20. To achieve improved driving actIon, the sprocket 36 is coupled via an endless loop chain 40 to a sprocket 42 which, in turn, drives a shaft 44 extending between the opposite ends of the support arms 10a and 10b and the opposite ends of the support arms 16a and 16b.

Defining a first endless loop for a first outwardly disposed endless chain pair 46 are a pair of horizontally displaced sprockets 48a and 48b mounted on the drive shaft 34 and a pair of similarly displaced sprockets 50a and 50b mounted on the drive shaft 44. The vertical displacement between the sprockets 48a and 50a, 48b and 50b depends upon the height of the truck frame 18 relative to the truck dock 28. As shown, the support arms 16a and 16b have formed therein protrusions 51a, 51b, 51c and 51d, which engage the surface of the truck dock 28 and accordingly, raise the elevation of the frame 2 to a small extent.

Spaced laterally to the left of the sprockets 50a and 50b are sprockets 52a and 52b which are mounted on and rotatable about a rod 54 secured at its opposite ends to the other ends of the support arms 16a and 16b. A pair of sprockets 56a and 56b pivot about a pair of rods 58a and 58b, respectively, extending from upstanding flanges 59a and 59b formed in the support arms 16a and 16b and direct the endless chain pair 46 upwardly to a pair of sprockets 60a and 60b. The sprockets 60a and 60b are mounted on rods 62a and 62b respectively which extend inwardly from the support arms 12a and 12b and also define a pivot point between the support arms 12a, 12b and the support arms 14a, 14b, respectively. As shown, the sprockets 60a and 60b lie in the same vertical plane with the sprockets 48a and 48b, and accordingly, the endless chain pair 46 extends laterally from the sprockets 60a and 60b to the sprockets 48a and 48b.

Defining a second endless loop for a second inwardly disposed endless chain pair 64 are a pair of spaced sprockets 66a and 66b mounted on the drive shaft 32. It can be seen that the two endless chain pairs 46 and 64 are coextensive at the start of the loading operation which begins at the sprockets 48a, 48b and 66a and 66b. FrOm the sprockets 66a and 66b, the chain pair 64 is guided downwardly to a pair of sprockets 68a and 68b mounted on the drive shaft 44. Thereupon, the chain pair 64 is guided laterally in a first vertical plane to a pair of spaced sprockets 70a and 70b mounted on the shaft 54 which extends between the support arms 16a and 16b. Accordingly, the endless chain pairs 46 and 64 remain coextensive in their travel until reaching the sprockets 56a, 56b and 70a, 70b, respectively.

The endless chain pair 64 then travels laterally to the right in a second vertical plane to a pair of sprockets 72a and 72b mounted on rods 74a and 74b which extend inwardly from a second pair of upstanding flanges 76a and 76b formed on the support arms 16b and 16a, respectively. The sprockets 72a and 72b guide the second endless chain pair 64 upwardly to the sprockets 66a and 66b mounted on the drive shaft 32.

As best illustrated in FIG. 1, the lateral displacement between the sprockets 56a, 56b which guide the first endless chain pair 46 upwardly and the sprockets 72a, 72b which guide the inner endless chain pair 64 upwardly determinative of the required longitudinal extent of a load carrying platform which is conveyed by the endless chain pairs 46 and 64. Specifically, a platform 80, which may be of flexible construction, includes laterally extending forward and rearward support flanges 82 and 84 respectively which are received and retained by the endless chain pairs 64 and 46, respectively. The distance between the forward and rearward flanges 82 and 84 equals the displacement between the sprockets 56a, 56b an: 72a and 72b. As particularly shown in FIG. 1, this is necessary to make certain that the platform is maintained in a horizontal position as it is carried by the chains 46 and 64 upwardly or downwardly.

In operation and with particular reference to FIG. 3, the truck 20 is backed into a loading station and the support frame 22 disconnected from the truck frame 18 and dropped from the truck to a position where at the support arms 16a and 16b rest against the dock 28. For a loading operation, such as the type shown in FIG. 3, unit loads of material 84a–84n are loaded from the platform rollers 86 onto the truck 20 in the following manner:

A number of platforms 80 are mounted on the endless loop chains 46 and 64 such that, at the time a unit load of material 84d is being deposited onto the truck 20, a unit load of material 84e is set for engagement with a second platform. Specifically, the worm gear 34 iS driven in the appropriate direction by the drive shaft 30 to implement the clockwise rotation of the drive shafts 32 and 44 (FIG. 2). As each platform 80 moves toward the platform rollers 86, each unit load of material is transferred onto the platform and the platform transports the load at first laterally between sprockets 56a, 56b and 72a, 72b and then upwardly to the sprockets 60a, 60b and 66a, 66b. Thereafter, the platform moves laterally to deposit each unit load onto the truck. As shown, the truck 20 may comprise rollers to facilitate the transfer of the unit loads from the platform 80 to the truck.

To unload unit loads of material from the truck, the drive shaft 38 in the truck is driven in a reverse direction to implement a counterclockwise rotation by the drive shafts 32 and 44 respectively. In this operation, the unit loads of material are transferred from the truck 20 by depositing the loads onto the platforms 80 as the platforms move from the lower sprockets 50a, 50b, and 68a, 68b to the upper sprockets 48a, 48b and 66a and 66b, respectively. The unit loads are then conveyed laterally to a position between the sprockets 66a and 66b and the sprockets 60a, 60b and thence downwardly to a position between the sprockets 72a, 72b and the sprockets 56a, 56b. Thereafter, the unit loads are transferred from the platforms 80 to the platform rollers 86.

In the illustrative permanently installed vertical lift device arranged according to the present invention, as shown in FIG. 4, the connections between the support arms 100a, 100b; 102a, 102b; 104a, 104b, and 106a, 106b of the support frame 108 are pivotal such that the overall height of the frame 108 can be adjusted to suit any particular truck. In this particular embodiment, the frame 108 is mounted in a truck bed 110 and the elongated lower support arms 106a, 106b are supported on springs 112a, 112b, 112c and 112d, respectively.

By elongating the support arms 106a and 106b, there is substantial lateral movement by the platforms 114 which are secured at their forward and rearward edges to the inwardly and outwardly disposed endless loop chain pairs 116 and 118, respectively. In particular, the guide sprockets 120a, 120b and 122a, 122b (only sprocket 120a being shOwn) for the chain pairs 118 and 116 are located at the ends of the support arms 106a, 106b and are laterally spaced from the guide sprockets 124a and 124b for the outwardly disposed chain pair 118 by a substantial distance. Preferably, the platforms 114 move laterally an extended distance which is at least as great as the distance between the forward and rearward edges thereof, i.e., the distance between the guide sprockets 124a, 124b and the guide sprockets 126a, 126b for the chain pair 116.

As shown by the broken lines 128, to accommodate different truck sizes the support frame 108 is adjustable such that the overall configuration may vary from the illustrated generally square-shaped configuration to a generally angular configuration. Accordingly, the permanently installed vertical lift device of the instant invention need not be specifically designed to suit anY particular installation. Rather, the lift device may be adjusted after installation to accommodate the different vertical dimensions that maY exist between the loading dock 110 and a truck or loading platform.

Although the invention has been described herein with reference to specific embodiments, many modifications and variations therein will readily occur to those skilled in the art. For example, all the sprockets, except for the drive sprockets, disclosed in the various embodiments of the invention may be replaced by plain discs and the like. Also, stationary guide supports mounted between the spaced sprockets may be provided to supply support for the chain pairs and to reduce lateral vibration by the platforms carried by the chain pairs. Accordingly, all such modifications and variations are included within the intended scope of the invention as defined by the following claims.

1. A transport device attachment for trucks comprising at least four corresponding pairs of support arms adapted to be secured to the frame of a truck and pivotally connected at their ends to define a support frame, said frame having a configuration dependent upon the displacement between the truck frame and the truck dock onto which the support frame is dropped, at least two pairs of offset and movable endless flexible support members supported in their travel by the support frame, a first plurality of guide members for maintaining the flexible support members coextensive and for guiding the members in a first direction, a second plurality of guide members for guiding one pair of the support members to the first plurality of guide members in a second direction and at least third and fourth pluralities of laterally spaced guide members responsive respectively to one of the two pairs of flexible support members for guiding the members to the first plurality of guide members and to the second plurality of guide members, respectively, in a third direction and reversible drive meanS operatively coupled to at least the first plurality of guide members for moving the guide members in either of two directions to implement the movement of the support members in either of the two directions.

2. A transport device according to claim 1 wherein the support arms are pivotal through angles of ninety degrees to impart a configuration to the support frame ranging from a flattened shape, through an angular shape to a generally square shape and the lateral separation between the second plurality of guide members and selected guide members of the first plurality of guide members corresponds to the lateral separation between the third and fourth pluralities of guide members and further comprising platform means secured at one end to one pair of support members and secured at its other end to the other pair of support members.

3. A transport device according to claim 2 wherein the distance between the ends of the platform means secured to the two pairs of support members corresponds to the lateral separation between the third and fourth pluralities of guide members.

4. A transport device according to claim 1 wherein the support bars are adapted for attachment to the frame of a truck and wherein the reversible drive means comprises a drive shaft mounted in said truck and operatively coupled to at least the first plurality of guide members to drive the guide members in either of two directions.

5. A transport device according to claim 4 wherein the first plurality of guide members comprises two pairs of offset sprockets adapted to guide the offset endless flexible support members in their travel, another two pairs of sprockets vertically displaced from the two pairs of sprockets a distance adapted to correspond to the vertical displacement between the frame of the truck and a loading dock, and still another two pairs of sprockets laterally displaced from said another two pairs of sprockets and located in the same vertical plane therewith.

6. A transport device according to claim 5 wherein the second plurality of guide members comprises two pairs of sprockets laterally displaced from the two pairs of offset sprockets comprising the first plurality of guide members and located in the same vertical plane therewith, wherein the third plurality of laterally spaced guide members comprises one pair of sprockets located in a first vertical plane and wherein the fourth plurality of guide members comprises one pair of sprockets located in the first vertical plane and spaced laterally from the third plurality of guide members.

7. A transport device according to claim 1 wherein at least two pairs of offset and movable endless flexible support members comprise a plurality of pairs of offset and movable endless flexible support members and further comprising load supporting platform means, the platform means comprising a plurality of spaced rigid linear members, each member being connected at its ends to one pair of said movable endless support members.

* * * * *